United States Patent [19]

Traver et al.

[11] 4,190,688
[45] Feb. 26, 1980

[54] SILICONE PAPER RELEASE COMPOSITIONS

[75] Inventors: Frank J. Traver; Timothy J. Cietek, both of Troy, N.Y.

[73] Assignee: General Electric Company, Waterford, N.Y.

[21] Appl. No.: 886,985

[22] Filed: Mar. 15, 1978

[51] Int. Cl.$^2$ .................. B05D 3/02; C08L 43/04; C08L 91/00
[52] U.S. Cl. .................. 427/391; 260/18 S; 260/29.2 M; 424/28; 427/387; 525/2; 525/4; 525/5; 525/478
[58] Field of Search ............... 260/29.2 M, 825, 18 S; 427/391, 387

[56] References Cited

U.S. PATENT DOCUMENTS

| | | | |
|---|---|---|---|
| 3,847,848 | 11/1974 | Beer | 260/29.2 M |
| 3,900,617 | 8/1975 | Grenoble | 260/825 |
| 4,008,346 | 2/1977 | Moeller | 260/29.2 M |

*Primary Examiner*—J. Ziegler
*Attorney, Agent, or Firm*—John L. Young; E. Philip Koltos; Philip L. Schlamp

[57] ABSTRACT

A paper release coating emulsion composition comprising a vinyl-containing polymer of the formula,

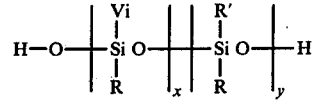

where Vi is vinyl, R is an aliphatically saturated monovalent hydrocarbon radical, R' is a monovalent hydrocarbon radical and x and y vary such that the polymer has a viscosity varying from 1500 to 24,000 centipoise at 25° C., a hydride cross-linking agent, water and a emulsifying agent. Such a composition can be cured either with a tin salt of a carboxylic acid or it can be cured with a platinum complex catalyst.

28 Claims, No Drawings

SILICONE PAPER RELEASE COMPOSITIONS

BACKGROUND OF THE INVENTION

The present invention releates to silicone paper release coating emulsion compositions and more particularly, the present invention relates to paper release silicone coating emulsion compositions which can be cured either with a tin catalyst or a platinum catalyst.

Silicone paper coating compositions are well known. Traditionally, such systems comprise a silanol terminated diorganopolysiloxane polymer, a hydride polysiloxane cross-linking agent and a tin salt of a carboxylic acid as the catalyst. Other additives were added to these ingredients and the total ingredients were then emulsified with the appropriate emulsifying agents in water to prepare a silicone paper treating emulsion. The resulting emulsion was then applied to paper using various types of equipment so as to apply a coating of silicone of about 1 to 3 mills thick on the paper.

As so treated, such paper had very good release properties to pressure sensitive adhesives. Accordingly, such paper could be applied as release backing over pressure sensitive adhesive tapes and when desired the paper could be easily stripped off from the pressure sensitive adhesive tape. Such pressure sensitive adhesive tapes and the paper release tapes appended to the adhesive tapes has widespread used in the home and industry.

Accordingly, the need for silicones and other materials to make paper releasable to pressure sensitive adhesive tapes is in great demand. Silicones are especially sought after as paper release coatings because they are non-toxic, they are inert to the pressure sensitive adhesives and also provide generally, a good release surface for pressure sensitive adhesives. Accordingly, the demand for silicones for this application has increased from year to year. In line with such increase in demand of silicones for such application there has developed a continued effort into obtaining better and better silicone paper release coatings.

There was several criterion that were developed for the evaluation of silicone paper coating compositions so as to produce good paper release coatings. Such criterion was that the silicone coating should have the proper flow properties so it could be applied with existing equipment and that the silicone coating should be such that the emulsion did not wet out the paper.

Another desirable property for the silicone coating was that it should have some abrasion resistance, that is it would not rub off when it was rubbed so that it would be maintained on the surface of a paper to act as a paper release coating. Also the coating had to cure properly in the time allotted for the cure of the coating within industrial limitations and did not require a post-bake cure, thus decreasing the time necessary to process the release coated paper. The tin curing composition as mentioned previously, was able to meet many of the above criteria. However, while inexpensive, it did require a post cure and in addition, such tin catalyzed silicone coatings also did not have as good abrasion resistances as would be desired.

Accordingly, one improvement in this area was the development of SiH olefin platinum catalyzed silicone compositions as coating compositions for paper. Such SiH olefin compositions generally comprised a vinyl-terminated diorganopolysiloxane polymer, a hydride polysiloxane cross-linking agent and a platinum complex catalyst. While such platinum cured paper release coatings were more expensive than the tin catalyzed versions, they had the advantages that they were faster curing and required no post-bake cure. However, it was found that in some cases that such platinum catalyzed paper release coatings did not have as good abrasion resistance as would be desired. Such platinum catalyzed coatings were formulated in the form of emulsions, since emulsions were easier to apply by traditional equipment.

Presently, there has been developed solventless systems both of the tin catalyzed version and the platinum catalyzed version. A disclosure of such solventless systems is to be found in the patent application of Maurice E. Grenoble Ser. No. 748,738 filed Dec. 9, 1976 presently pending before the Patent Office. The advantage of such solventless systems is that they eliminate the need of emulsifying agents and solvents to produce the desired emulsions, while solvents and emulsifying agents would evaporate into the atmosphere when the paper release coating was dried, thus possibly creating pollution problems. Accordingly, for the extingency of where the evaporation of the solvent and emulsifying agent vapors might cause pollution problems in a paper treating plant, the solventless systems were developed and have been found satisfactory in this respect. However, such solventless systems have not gained widespread use in the industry as yet, since they require special equipment to apply versus the emulsion systems.

Accordingly, as stated previously, it may be desirable to utilize in a paper treating plant two systems for producing paper release coatings where it is desired to have an inexpensive system in which the optimum of adhesive release properties are not that important and one in which a post-bake cure can be utilized. On the other hand, in the same manufacturing plant it may be desired to treat the paper with the paper release coating which has the optimum of release properties, which requires no post-bake cure, and which has good abrasion resistance. Accordingly, as can be envisioned in the same manufacturing plant, it is desirable at that time to switch from one paper release coating system to another. In such plants it was found that after the tin system had been used, that extra care had to be taken to completely clean the tin out of the equipment, otherwise, the tin would poison the platinum if the platinum system was used subsequently. In addition, it was found that in going from one system, the entire ingredients there were to be used to treat the paper would have to be changed in going from a tin catalyzed paper release coating system to platinum catalyzed silicone paper release system. Accordingly, it was highly desirable to provide or develop a single system which could be cured with either a tin catalyst or a platinum catalyst in which the system would not be become poisoned by the tin if it was decided to subsequently use platinum in the system.

It was felt that such system could be devised by having the base polymer, a diorganopolysiloxane polymer which was silanol terminated and which had vinyl in the polymer chain. A system disclosing such a base polymer is that to be found in Moeller U.S. Pat. No. 4,008,346, which is incorporated by reference into the present case. This patent discloses a paper release coating emulsion comprising a vinyl containing base polymer having silanol terminal groups, a hydride cross-linking agent and a platinum catalyst. The distinction in this invention of the prior art is that the base polymer is produced by emulsion polymerization so that it is not necessary to emulsify the base polymer to produce the paper coating emulsion. It was determined by such emulsion polymerization the viscosity of the base vinyl-containing polymer would have to have a viscosity in the range of 25,000 centipoise to 1 million centipoise at 25° C. When it was attempted to cure such a polymer, that is the silanol terminated diorganopolysiloxane polymer of the Moeller Patent having vinyl in the polymer chain, it was found that such a polymer would not cure with a tin catalyst. It would only cure with a platinum catalyst. As pointed out previously, the reason for the high viscosity of the vinyl-containing base polymer is the emulsion polymerization by which it is produced as disclosed in the foregoing Moeller Patent. Indeed, it was felt it was because of this high viscosity of the polymer that such a polymer did not have a sufficient silanol content such that it could be cured with a tin catalyst.

Accordingly, it was unexpected that a silanol terminated diorganopolysiloxane polymer having vinyl on the polymer chain, which was not produced by emulsion polymerization, but which was emulsified could be cured with either a tin catalyst or a platinum catalyst to produce an acceptable paper release coating composition.

It should be noted that while the Moeller coating was an advantageous type of coating for paper release coating applications, because it was emulsified in process and it could still not be cured with a tin catalyst and further did not have a very good abrasion resistance, that is in many cases, unless the composition was post-cured the coating would smudge or rub off when it was rubbed with a finger.

Accordingly, it is one object of the present invention to provide for a silicone paper release coating composition which can be cured either with a tin catalyst or can be cured with a platinum catalyst.

It is an additional object of the present invention to provide for a silicone paper release coating composition which, when cured with a tin catalyst or cured with a platinum catalyst has good abrasion resistance.

It is an additional object of the present invention to provide for a process for producing a silicone paper release coating composition which can be cured with either a tin catalyst or a platinum catalyst.

It is yet an additional object of the present invention to provide for a process for coating paper with a paper release coating composition which can be cured with either a tin catalyst of a platinum catalyst. These and other objects of the invention are accomplished by means of the disclosure set forth hereinbelow.

SUMMARY OF THE INVENTION

In accordance with the above objects there is provided by the present invention a paper release coating emulsion composition comprising (A) 100 parts by weight of a vinyl-containing polymer of the formula,

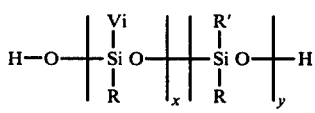

(1)

where Vi is vinyl, R is an aliphatically saturated monovalent hydrocarbon radical, R' is a monovalent hydrocarbon radical and x and y vary such that the polymer has a viscosity varying from 1,500 to 24,000 centipoise at 25° C.; (B) from 1 part per million to 2 parts by weight of a catalyst selected from the class consisting of platinum catalyst and tin soaps of carboxylic acids; (C) from 1 to 30 parts by weight of a hydride polysiloxane cross-linking agent; (D) from 50 to 300 parts of water and (E) from 5 to 80 parts by weight of emulsifying agents. Preferably, the vinyl-containing polysiloxane is emulsified in water in an emulsifying agent such as polyvinylalcohol with or without an organic solvent such as xylene and then the hydride polysiloxane cross-linking agent is emulsified itself and then the two emulsions are mixed and applied to form the desired coating.

It should be noted that both the tin catalyst version and/or platinum catalyzed version can be cured either at room temperature or at elevated temperatures. As can be appreciated the cure at elevated temperatures is much more rapid than the cure at room temperature. It should be noted more specifically that the tin catalyst is generally utilized at a concentration of 0.1 to 2 parts by weight as tin of the tin salt of the carboxylic acid which tin salts is preferably dibutyltindilaurate. Another preferred tin catalyst is for instance di(N-octyl) tin S,S'-bis-(isooctylmercaptoacetate). The platinum catalyst is utilized at a much lower concentration, that is at a total concentration of 1 to 200 parts per million platinum and is preferably present as a platinum complex of platinum with a hydrocarbon selected from the class consisting of alcohols, aldehydes and ethers. The hydride polysiloxane can be any of various kinds of cross-linking agents. Thus, the hydride polysiloxane cross-linking agent can be a hydride containing diorganopolysiloxane polymer of 1 to 250 centipoise viscosity at 25° C. or it can be a hydride resin composed of monofunctional siloxy units and tetrafunctional siloxy units or can be hydride siloxy resin composed of monofunctional siloxy units, tetrafunctional siloxy units and difunctional siloxy units. The particular form of the hydride cross-linking agent will be selected such there is obtained optimum properties for a particular application of the paper release coating.

DESCRIPTION OF THE PREFERRED EMBODIMENT

In the compound of Formula 1 above, R is any aliphatically saturated or aromatic monovalent hydrocarbon radical, thus R can be selected from alkyl radicals such as methyl, ethyl, propyl, etc. cycloalkyl radicals such as cyclohexyl, cycloheptyl; mononuclear aryl radicals such as phenyl, methylphenyl, ethylphenyl, etc. and halogenated alkyl radicals more specifically fluoroalkyl radicals of from 3 to 8 carbon atoms such as 3,3,3 trifluoropropyl. Most preferably, R is selected from methyl, ethyl and phenyl radicals. The R' radical can be the same radicals as R and also including aliphatically unsaturated radicals such as vinyl allyl, etc. Most preferably the R' radical is a radical selected from alkyl radicals from 1 to 8 carbon atoms and phenyl radicals.

It should be noted that the R' radical can also be a fluoroalkyl radical of 3 to 8 carbon atoms such as 3,3,3 trifluoropropyl. Most preferably the R' radical is selected from methyl and phenyl radicals. It should be noted that the fluoroalkyl substitution in the polymer of Formula 1 above would give a polymer which has solvent resistance. Unless, it was necessary to obtain a paper release coating that has solvent resistance, it would not be necessary to substitute or have a base polymer in the paper release coating composition in which the substituent group was a fluoroalkyl radical.

It should be noted that all of the R and R' radicals need not be 3,3,3 trifluoropropyl, it just being necessary that there be sufficient amounts of the trifluoropropyl substituent groups in the polymer so as to give the resultant paper release coating composition the desired solvent resistance.

As noted previously in the compounds of Formula 1, x and y will vary such that the polymer has a viscosity varying from 1500 to 24,000 centipoise at 25° C. and more preferably has a viscosity that varies from 2,000 to 10,000 centipoise at 25° C.

It should be noted that viscosities above 24,000 centipoise in the base polymer of Formula 1 are not preferred since the compound will not cure in the presence of a tin catalyst. In order for the polymer to have the appropriate amount of silanol groups so as to cure with a tin catalyst the compound of Formula 1 should have a silanol content that varies anywhere from generally 650 to 2400 parts per million and preferably has a silanol content that varies anywhere from 1,000 to 2400 parts per million. In addition for the same compound to be cured with a platinum complex catalyst, then it is preferred that the polymer have vinyl content which varies anywhere from 0.1 to 2% by weight and more preferably varies from 0.2 to 1.5% by weight. Such a polymer can then be cured with either a platinum catalyst with the hydride cross-linking agent in an SiH olefin platinum catalyzed reaction or it can be cured with a tin catalyst in a condensation reaction with the silanol group in the compounds of Formula 1 and the hydride to form a paper release coating. The compounds of Formula 1 can be obtained by well-known silicone polymerization techniques. It should be noted that the compound of Formula 1 cannot be obtained through emulsion polymerization since as has been pointed out, it is not possible to obtain compounds within the scope of Formula 1, with as low a viscosity as the compounds of Formula 1, through emulsion polymerization. To obtain the compounds of Formula 1, the following procedure can be followed. The appropriate dimethyldichlorosilanes and methylvinylchlorosilanes are hydrolyzed in water. The resulting hydrolyzate is then taken and there is added to it a sufficient amount of alkali metal hydroxide or an alkali metal hydroxide such as, potassium hydroxide and the resulting mixture is heated at elevated temperatures so as to preferentially distill overhead and obtain cyclotetrasiloxanes. The cyclotetrasiloxanes that would be obtained will depend, of course, on the chlorosilane hydrolyzate that was obtained.

Accordingly, proceeding with the fact that methylvinyldichlorosilane was first hydrolyzed there is obtained methylvinylcyclotetrasiloxane in high yields by heating the hydrolyzate with potassium hydroxide at elevated temperatures. The methylvinylcyclotetrasiloxane may then be taken and mixed with other types of cyclotetrasiloxanes, that is, cyclotetrasiloxanes having other types of substituent groups which cyclotetrasiloxanes are obtained by the exact same procedure. To such cyclotetrasiloxanes there is added anywhere from 5 to 500 parts per million of potassium hydroxide and a sufficient amount of water so as to obtain the appropriate amount of chain-stopping in the polymer. It should be noted that since water acts as a chain-stopper in this reaction then the amount of water that is utilized in the reaction mixture will determine the polymer chain length and, of course, its viscosity.

Accordingly, the appropriate amounts of water must be utilized so as to obtain a polymer of Formula 1, which has the desired viscosity and the desired amount of silanol content. The resulting mixture is then heated at temperatures above 150° C., anywhere from 5 to 24 hours, during which period of time there is formed the compound of Formula 1. At the peak of the equilibration reaction as much of the cyclotetrasiloxanes are breaking up to form the polymer of Formula 1, as there is of the resin of the polymer of Formula 1, breaking up the formed cyclotetrasiloxanes. Usually this point is reached when 85% of the cyclotetrasiloxanes have been converted to the linear polymer. It should be noted that although the compound of Formula 1 is substantially a linear polymer, that up to 2% by weight trifunctionality in the polymer can be tolerated. This usually will result from impurities that may be present in the cyclotetrasiloxanes reactant.

However, it should be noted that a polymer within the scope of Formula 1, can be obtained in which the amount of trifunctionality is considerably below 2%. Once the equilibration point is reached, the alkali metal hydroxide in the reactants is neutralized with phosphoric acid or a silyl phosphate, that is, the reaction product of a siloxane and phosphoric acid, so as to neutralize the base. The unreacted cyclics are vented off or stripped off to yield the desired compound of Formula 1. The foregoing compound of Formula 1, may then be utilized in an SiH-olefin platinum catalyzed reaction or may be cured with a tin soap as will be disclosed below. The resulting compound of Formula 1, may then be emulsified in water using as an emulsifying agent, polyvinyl alcohol, to yield an emulsion which may be utilized to form a paper release coating. Since the platinum complex catalyst is normally incorporated into the compound of Formula 1, when it is emulsified, the platinum complex catalyst will first be discussed before going into the preparation of the emulsion. Any type of a solubilized platinum complex catalyst can be utilized in the instant invention.

Many types of platinum compounds for this SiH-olefin addition reaction are known and such platinum catalysts may be used also for the reaction of the present case. The preferred platinum catalysts especially when optical clarity is required are those platinum compound catalysts which are soluble in the present reaction mixture. The platinum compound can be selected from those having the formula $(PtCl_2 \cdot Olefin)_2$ and $H(PtCl_3 \cdot Olefin)$ as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride, cyclopropane complex $(PtCl_2 \cdot C_3H_6)_2$ described in U.S. Pat. No. 3,159,662, Ashby. Still, further, the patent containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are incorporated into the present application by reference. The preferred platinum compound to be used not only as a platinum catalyst but also as a flame retardant additive is that disclosed in U.S. Pat. No. 3,775,452, Karstedt. Generally speaking, this type of platinum complex is formed by reacting chloroplatinic acid containing 4 moles of water of hydration with tetravinyltetramethylcyclosiloxane in the presence of sodium bicarbonate in an ethanol solution. Any of the above platinum complexes can be utilized in the instant invention. However, the most preferred are the Lamoreaux catalysts which is platinum complex formed with platinum and a compound selected from aliphatic alcohols, ethers and aldehydes and is more preferably a platinum complex formed from platinum, metal and an organic aldehyde as disclosed in the foregoing Lamoreaux patent which is incorporated in the present case by reference. The Karstedt catalyst which is also a suitable catalyst can be utilized in the instant case. The Karstedt platinum catalyst is especially desirable since it is a very efficient catalyst for an SiH-olefin platinum catalyzed reaction. Generally, the Karstedt catalyst comprises the reaction product of a platinum halide with vinylpolysiloxane wherein the final platinum complex is substantially free of chemically bound chlorine. It has been found that the Karstedt platinum catalyst is a very efficient catalyst and will allow very rapid reaction to take place between the hydride polysiloxane and a vinyl-containing polysiloxane. However, the Lamoreaux catalyst is also suitable for use to produce a paper release coating within the scope of the instant case.

In forming the emulsion of the compound of Formula 1, with the platinum catalyst, there may be added other ingredients to the emulsion such as, corrosion inhibitors and bactericides. Accordingly as an example there may be formed an emulsion by taking 40-50% by weight of the vinyl fluid of Formula 1, 10 to 20% by weight of an emulsifying agent such as, polyvinyl alcohol, 0.04 parts by weight of sorbic acid, which is a bactericide, 0.20 parts of sodium benzoate as a thixotropic to prevent the resulting emulsion that is formed from wetting in too rapidly into the pores of the paper that is treated, 0.04% of platinum catalyst and 10-30% by weight of water. To prevent bacteria from growing on the paper release coating once it has been used to coat paper or during storage for that matter, bactericide additives are used.

It should be noted that the bactericides are needed in the silicone compositions of the instant case since silicones will traditionally support the growth of bacteria. Accordingly, to keep the composition as free from bacteria as possible and to prevent color degradations which result from the growth of bacteria on the silicone paper release coating, it becomes necessary to include bactericides in the emulsion composition. With the above concentration of the ingredients, the emulsion is formed by charging the platinum catalyst and the vinyl-containing compound of Formula 1, to a premixed tank. Then the polyvinyl alcohol is added with continued mixing at moderate mixing speeds for 20 to 30 minutes. After the mixing has been carried out, there is slowly added to the mixture the first quantity of water. The rate of addition and agitating should be sufficiently slow to avoid inversion. There is continued agitation after the above quantities have been mixed for an additional period of time of thirty minutes at moderate agitation speeds. After that time then the second quantity of water is charged as well as the bactericides. The second quantity of water and bactericides are then uniformly mixed in the composition. Then the mixture is passed through a Manton-Gaulin Colloid Mill at high speed using a 3-inch rotostater with a clearance of 5 to 12 mills until the milling is complete. Then the paste that is formed should be agitated continually in the blend tank at slow speed and for 20 to 30 minutes after the milling is complete. The rate of agitation in the blend tanks should be sufficient to disperse the paste and slow enough to avoid air entrapped. The resulting emulsion may then be filtered and be ready for use as such to produce a paper release coating within the scope of the instant case.

It should be noted that the foregoing procedure applies also when the compound of Formula 1 is to be cured with the tin soap. However, in that case the platinum catalyst is not incorporated in the emulsification procedure for preparing the emulsion of the compound of Formula 1. When a tin catalyst is prepared then the tin catalyst is emulsified itself in a third separate emulsion and utilized as such to form a paper release coating. When a platinum complex catalyst is utilized to cure the system, then as stated above, the platinum complex is incorporated into the compound of Formula 1, when it is emulsified as was discussed above.

It should be noted that when the platinum catalyst there is utilized a platinum catalyst at a concentration of 1 to 200 parts per million of platinum per 100 parts of the vinyl compound of Formula 1. More preferably, there may be utilized from 1 to 50 parts per million of platinu, as platinum of the platinum complex catalyst which is based on 100 parts of the vinyl-containing polymer of Formula 1. Based on 100 parts of the vinyl-containing polymer of Formula 1, there is also utilized as the cross-linking agent from 1 to 30 parts by weight of a hydride polysiloxane as a cross-linking agent. The hydride polysiloxane can take various forms and can be any of the hydride polysiloxane cross-linking agents which are well known for SiH-olefin platinum catalyzed reactions. For instance, the hydride polysiloxane cross-linking agent may be a linear low molecular weight hydride polysiloxane polymer of the formula,

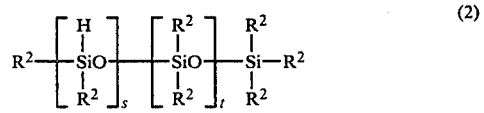

(2)

where $R^2$ is selected from hydrogen and monovalent hydrocarbon radicals and s and t vary such that the viscosity of the polymer varies from 1 to 250 centipoise at 25° C. and more preferably varies from 5 to 50 centipoise at 25° C. The foregoing $R^2$ radicals in compound of Formula 2 above, that is, in the formula of the hydride polysiloxane of Formula 2 above, may be any monovalent hydrocarbon radical or halogenated monovalent hydrocarbon radical such as, for instance, methyl, propyl, phenyl, cyclophenyl, methylphenyl and 3,3,3-trifluoropropyl. The $R^2$ radical in the compounds of Formula 2 may also be selected from vinyl and allyl radicals. As long as the platinum catalyst is not incorporated in the hydride polysiloxane ingredient then the hydride polysiloxane of Formula 2 may contain aliphatic unsaturation. However, if the platinum catalyst is incorporated in the hydride polysiloxane cross-linking agent component then it could not contain aliphatic unsaturation since if it did, it would cross-link with itself.

It should be noted also that there can be hydrogen atoms on the terminal silicone atoms in the polymer chain as well as there can be hydrogen atoms only in the internal silicone atoms in the polymer chain. Most preferably, the hydrogen atoms are located only in the polymer chain since it has been found that a better cured product is obtained with hydrogen atoms in the polymer chain. However, a suitable paper release coating will be obtained where a hydrogen polysiloxane of Formula 2 is utilized when the hydrogen atoms are only in the terminal positions of the polymer chain on the hydrogen atoms or both in the terminal positions of the polymer chain and in the polymer chain itself. In addition to the definitions given above for the compound of Formula 2, it is necessary that the compound of Formula 2 have a hydride content that varies anywhere from 0.3 to 1.6% by weight in order that it properly cross-link with the compounds of Formula 1 to prepare an appropriate type of release composition. A hydride polysiloxane of Formula 2 above, is also obtained by a standard wellknown procedure. It is obtained by simply hydrolyzing the appropriate chlorosilanes in water and separating the hydrolyzate by simply decanting off the water acid layer from the resulting hydride polysiloxane of Formula 1, and the hydrolyzate is then purified by distillation fractionation techniques. Such distillation techniques also remove unwanted acid from the polymer such that it has an acidity below 15 parts per million so that it can be used as a cross-linking agent in the compositions of the instant case.

The polysiloxanes of Formula 2, must also be emulsified in order to be utilized with the emulsion of the compounds of Formula 1, to prepare a platinum catalyzed paper release coating composition. Preferred emulsifhing agents for such hybride polysiloxane are the alkylphenoxypolyoxyethyleneethanols where the alkyl groups in the compound has from 1–15 carbon atoms. Thus, in the emulsion of the hydride polysiloxane, as an example, there is utilized from 40–50 percent by weight of methyl hydrogen polysiloxanes and from 2 to 5% by weight of the emulsifier given before. There is also used a first quantity of water which varies anywhere from 2 to 4% and a second quantity of water which varies anywhere from 30 to 40% and finally a formaldehyde solution as a bactericide at a concentration of anywhere from 0.1 to 0.2% by weight. To prepare the emulsion, the hydrogen siloxane of Formula 2 is mixed with the emulsifier and the first quantity of water is thoroughly mixed therewith. This mixture is passed through the colloidal mill and then the paste is dissolved in the second quantity of water and formaldehyde solution. After agitation has been carried out for a sufficient time and dispensing and colloidal mill paste in the second quantity of water, then the emulsion is ready for use in the instant case.

To apply the emulsions to form a paper release coating, the emulsions are simply mixed in the right proportion such that there is from 1 to 30 parts of a hydride polysiloxane per 100 perts of vinyl polymer of Formula 1, in the mixture and the resulting emulsion mixture is then applied by known equipment to a paper so, upon evaporation of the water and with or without the application of heat, there results a silicone paper release coating on the paper. This system is a two-component system which is platinum catalyzed. If it is desired to catalyze the system with tin then there is a three-component system comprising the emulsion of the polymer of Formula 1, the emulsion of the polymer of Formula 2, and finally the emulsion of the tin catalyst. In the three component system, all three components are mixed and applied as an emulsion mixture to paper to produce a silicone paper release coating.

It should be noted that in the eventuality of this three component system, that is, the system with a tin soap, then the platinum catalyst is not added or emulsified with the compound of Formula 1. It should be noted that preferably the platinum catalyst is not emulsified with the compound of Formula 1, but is kept separate, and when it is desired to have a platinum curing system the platinum catalyst is simply added or agitated into the emulsion of the compound of Formula 1, that is, the emulsion of the compound of Formula 1 is formed as indicated above but without the addition of the platinum catalyst and the platinum catalyst can be added subsequently at any time when it is desired to have a platinum catalyst system by simply adding the catalyst and mixing it into the emulsion of the compound of Formula 1.

Another hydride cross-linking agent that might be utilized in the invention of the instant case is a hydride polysiloxane composed of $H(R^2)_2SiO_{0.5}$ units and $SiO_2$ units, where the $H+R^2$ to Si ratio varies from 1.0 to 2.7 and $R^2$ is a monovalent hydrocarbon radical. Again in this formula, $R^2$ has the same definition as given above for the $R^2$ radical in the hydride polysiloxane of Formula 2. This second crosslinking agent is a hydride silicone resin composed of monofunctional units and tetrafunctional units.

Another type of silicone resin that can be utilized as a hydride crosslinking agent is one composed of $H(R^2)_2SiO_{0.5}$ units and $SiO_2$ units and $H(R^2)SiO$ units where the ratio of $R+H$ to Si varies from 1.0 to 2.7, and the R is a monovalent hydrocarbon radical as given previously for the resin which only had monofunctional units and tetrafunctional units and is the same as the $R^2$ radical which definition was given previously for the hydride polysiloxane of Formula 2, that is, in the $R^2$ radical in the hydride silicone resins, can be selected from an alkyl radical of 1 to 8 carbon atoms, phenyl radicals, methylphenyl radicals and other mononuclear aryl radicals, cycloalkyl radicals such as, cyclohexyl, cycloheptyl, cyclooctyl radicals and fluroalkyl radicals such as 3,3,3-trifluoropropyl.

Again, if the platinum catalyst is not incorporated in the hydride polysiloxane or the hydride silicone resin or in the emulsion of the hydride silicone resin, then the $R^2$ radical can also be selected from aliphatically unsaturated radicals such as, vinyl, allyl, etc. Preferably, the $R^2$ radical in the hydride silicone resins as well as in the hydrogen polysiloxane of Formula 2 is selected from methyl, ethyl and phenyl.

The hydride silicone resin cross-linking agents are obtained by hydrolysis procedure. Such procedure comprises taking, for instance, a hydrogen diorganochlorosilane and tetrachlorosilane and hydrolyzing it in water with or without an organic solvent present. The resultant silicone resinous structure that is formed is then separated and purified by well known techniques. Thus, the resin may be washed with water so as to remove as much acid from the resin as possible, and finally the silicone resin can be neutralized or approximately neutralized to an acidity of less than 15 parts per million of acid with a mild base such as, sodium bicarbonate. The resulting hydride silicone resin then be utilized as a crosslinking agent in SiH-olefin platinum catalyzed compositions. The procedure for producing the hydride silicone resin, also containing hydrogen organo difunctional siloxy units is similar to that above for the more simple resin, the only difference being that there is utilized as a reactant a hydrogen organodichlorosilane. Irrespective of which hydrolysis technique is used, that is, one with a water immiscible organic solvent or one without a water immiscible organic solvent, there would be obtained to some degree the hydride silicone resins disclosed above, which resins can be utilized as a crosslinking agent in the invention of the instant case. The polysiloxane of Formula 2 above is preferred over the hydride silicone resins as a crosslinking agent since it is easier to emulsify and reacts much faster to produce the paper release coating. The hydride silicone resins are preferred in that they give more abrasion resistant coatings when they are utilized as cross-linking agents for the vinyl-containing polymer of Formula 1.

It should be noted that the vinyl-containing fluid of Formula 1 of the instant case can be cured either with a hydride polysiloxane of Formula 2 above or can be cured with a hydride silicone resin composed only of monofunctional siloxy units and tetrafunctional siloxy units or can be cured with a hydride silicone resin composed of monofunctional siloxy units, tetrafunctional siloxy units and difunctional siloxy units. Irrespective of the hydride cross-linking agent that is utilized, the vinyl-containing polymer of Formula 1, would cure to form a good silicone paper release coating. The only difference in the selection of hydride cross-linking agents being in the rate of cure and also in the abrasion resistance of the cure that is obtained depending on what type of hydride cross-linking agent was used. Hydride silicone resins as was the case for the hydride polysiloxane of Formula 2, are also emulsified prior to their being mixed into the emulsion of the polymer of Formula 1.

As an example, such as emulsion is prepared by taking anywhere from 10 to 20% by weight of the hydride silicone resin or 10-20% of the compound of Formula 1, 5-10% by weight of the alkylphenoxypolyoxyethyleneethanols, 0.04% by weight of acetic acid as a bactericide, 4.6% of the first quantity of water and 50-70% of a second quantity of water, and 0.1% of Formalin, that is, a solution of formaldehyde as a bactericide. It should be noted that as indicated above that some of the vinyl-containing polymer of Formula 1 may be incorporated into the emulsion of the hydride polysiloxane silicone resin or the hydrogen polysiloxane emulsion of Formula 2 above, that is, some of the vinyl-containing polymer of Formula 1 can be incorporated and emulsified with the hydrogen polysiloxane cross-linking agent so long as the platinum catalyst is not also present in the same emulsion. As long as the platinum catalyst is not in the same emulsion, then the hydride polysiloxane will not cross-link with the vinyl-containing polymer of Formula 1 to form a cured silicone coating.

Accordingly, so as to facilitate the mixing of the two emulsions together, that is, to facilitate the mixing of the hydride polysiloxane emulsion with the vinyl-containing emulsion of Formula 1 so that there will be more quantity of hydride polysiloxane emulsion to work with, some of the vinyl-containing polymer of Formula 1 may be incorporated and utilized in forming the emulsion of the hydride polysiloxane of Formula 2 or the hydride polysiloxane silicone resins.

Accordingly, to prepare the emulsion of the hydride silicone resin there is charged into a premixing kettle the hydride resin and the vinyl-containing polymer of Formula 1. The acetic acid and the first quantity of emulsifying agent is added and the mixture is heated for 30 minutes with slow agitation at 35° C. Then the first quantity of water is added at a sufficient rate so as to prevent inversion and the temperature of the mixture is maintained at 35° C., and agitation is continued for 30 minutes after the addition of water. Then the second quantity of water, acetic acid and formaldehyde is added to the blend and the agitation continuing with the temperature control maintained at 25° to 30° C. before passing it through the colloidal mill. The affluent paste on the mill is directed to the blend containing the second quantity of water. After the milling is completed the emulsion can then be stirred for a minimum of 45 minutes at 25°–30° C. Stirring is continued and the temperatures maintained at the above level until all of the paste has dissolved into the water. After that the emulsion is allowed to stand for a minimum of 30 minutes and there results the final hydride silicone resin emulsion for use as a cross-linking agent with the emulsion of the vinyl-containing polymer of Formula 1. Accordingly, utilizing the above procedures, there is obtained emulsions of the hydride cross-linking agent and of the base polymer of Formula 1 which emulsions can be mixed and applied and cured on paper to form silicone paper release coatings with known techniques and procedures as well as with present equipment utilized in paper release coating plants.

Finally, when it is desired to have a system that is cured by tin, it is necessary to emulsify the tin soap by itself so as to have a three component system, that is, the emulsion of the vinyl-containing polymer of Formula 1, the emulsion of the hydride polysiloxane of Formula 2, or an emulsion of one of the hydride silicone resins as disclosed previously and thirdly, an emulsion of the tin soap. When a tin catalyst system is being utilized, the three emulsion components are simply mixed and applied by known techniques to coat paper. The tin salt of a carboxylic acid can be utilized in the instant case. The most preferred tin soap is dibutyl tin dilaurate since it is readily available, inexpensive and is a very efficient tin catalyst.

It should be noted that when the tin catalyst or tin system is utilized then the concentration of the tin catalyst must be in the range of 0.1 to 2 parts by weight of a tin salt of a carboxylic acid. The above concentrations being given in terms of tin metal, per 100 parts of the vinyl-containing polymer of Formula 1. More preferably, the amount of tin catalyst that is utilized is a concentration of 0.5 to 1.5 parts of tin catalyst as tin, per 100 parts of the vinyl-containing polymer of Formula 1.

It should also be noted that the present tin system can either cure at room temperature or cure at elevated temperatures, that is, it has a prolonged shelf life at room temperature but cures very rapidly at elevated temperatures. To accomplish this with a tin system, it is common to use a mercapto tin salt of a carboxylic acid as the catalyst since such a mercapto tin salt of a carboxylic acid will cure the system very slowly at room temperature but will initiate the cure of the system at a very rapid rate at elevated temperatures, that is, temperatures above 300° F.

Accordingly, a good example of a mercapto tin salt of a carboxylic acid which gives extended work life to the emulsion mixtures of the instant case, that is, the three component tin system of the instant case, and yet cures the system at a very rapid rate at elevated temperatures is di(N-octyl)tin S,S'-bis(isooctylmercaptoacetate). It should be noted the same effect can be carried out with the platinum catalyzed system when it is desired, by simply incorporating an inhibitor in the platinum system such that the system would have a long shelf work life at room temperature after the hydride siloxane cross-linking agent is mixed with the polysiloxane of Formula 1, but will cure at a very rapid rate at elevated temperatures. Examples of inhibitors for platinum catalyzed systems that will give them such platinum catalyzed systems extended work life at room temperature but very quick curing at elevated temperatures, is, for instance, acetylenic compounds, hydroperoxy compounds and methylvinylcyclotetrasiloxanes.

It should be noted that the methylvinylcyclotetrasiloxanes are mild inhibitors to inhibit the platinum catalyzed compositions at room temperature for 10–20 minutes but allow cure of the system after that. However, the system even with any of these inhibitors in it, that is, the platinum catalyzed system with any of these inhibitors, will cure in a matter of minutes or even seconds upon being heated at temperatures above 100° C. It should also be noted the hydrogen content of the hydride silicone resin, that is, the hydride silicone resins composed of monofunctional siloxy units and tetrafunctional siloxy units, may vary anywhere from 0.3 to 1.6% by weight and the hydride content of the silicone resin composed of monofunctional siloxy units, tetrafunctional siloxy units and difunctional siloxy units may vary anywhere from 0.3 to 1.6% by weight and still function as an effective cross-linking agent.

With respect to the tin salt of a carboxylic acid, this can be emulsified with polyvinyl alcohol such that there can be utilized as an example from 20% by weight of the tin salt of a carboxylic acid such as, dibutyl tin dilaurate, 1.5 to 2% of polyvinyl alcohol, and aromatic solvent such as, xylene, mineral spirits and polychlorinated solvents up to 30% by weight, glycerin and other nonionic emulsifiers can be used up to 2% and then the mixture passed through a colloidal mill and adjusted to the appropriate solids with water. The resulting emulsion of the tin salt may then be used in a three component tin system of the instant case to prepare a paper release coating emulsion composition.

The emulsion of the compound of Formula 1, not containing the platinum catalyst, can be combined with an emulsion of a hydride cross-linking agent which is prepared as indicated previously and which can be combined with the emulsion of the tin salt to prepare the emulsion mixture which can then be applied over paper and dried to prepare a paper release coating. The paper release coating can be prepared either at room temperature or at elevated temperatures in accordance with the use of the mercapto tin salt versus the straight tin salt itself. Irrespective of which system is used, as is evident from the above disclosure, by simply utilizing the vinyl-containing compound of Formula 1 above an emulsion of such a compound can be cured and applied as a paper release coating either with a platinum system as disclosed above or with a tin system as also disclosed above.

The examples below are given for the purpose of illustrating the present invention. They are not given for any purpose of setting definitions to the scope of the invention of the instant case. All parts in the examples are by weight.

EXAMPLE 1

There was prepared an emulsion (Composition A) comprising a mixture of 50 parts by weight of silanol-terminated methylvinylpolysiloxane polymer having the viscosity of 2900 centipoise at 25° C. To this there was added 15.9 parts of polyvinyl alcohol, 0.04 parts of sorbic acid, 0.20 parts of sodium benzoate, 0.04 parts of platinum catalyst (as Lamoreaux catalyst as disclosed in the foregoing patent), 8.56 parts of a first quantity of water, 25.16 parts of a second quantity of water and 0.001 parts of formaldehyde. The emulsion was prepared by charging the vinyl fluid and the platinum catalyst to the premix tank. Then there was slowly added to the mixture, the polyvinyl alcohol and mixing was continued at moderate agitation speed for 20–30 minutes. After this, there was slowly added the first quantity of water, that is, the 8.56 parts of water while agitation was continuing. The rate of addition and agitation was sufficiently slow to avoid inversion. Then there was continued agitation at moderate speeds for 30 minutes. Then there was charged to the mixture the second quantity of water, that is, 25.16 parts of water, and the various bactericides, sorbic acid and sodium benzoate. The resulting mixtures were then milled through a Manton-Gaulin colloid mill at high speed using a three-inch rotor and stator and a clearance of 5–12 mils. The resulting paste that was obtained was then blended with water at slow speed agitation for 20–30 minutes, after the milling was complete. The milled paste was blended in the larger quantity of water and dispersed to form the desired emulsion at 50% silicone solids.

There was prepared an emulsion (Composition B) comprising a mixture of 20 parts by weight of a vinyl-terminated methylvinylpolysiloxane polymer and 20 parts by weight of a resin composed of dimethyl hydrogen siloxy units, $SiO_2$ units having a viscosity of 600 centipoise at 25° C. To this there was added 5.2 parts of alkylphenoxypolyethoxyethanol (nonionic emulsifier), 4.6 parts of a first quantity of water, 50.66 parts of a second quantity of water, 0.1 parts of Formalin and 0.04 parts of acetic acid. The emulsion was prepared by charging the vinyl fluid and the dimethyl hydrogen resin to the premix vessel. Next, the alkylphenoxypolyethoxyethanol emulsifiers were blended in the oils. Then there was slowly added the first quantity of water and mixing was continued at 35° C. under moderate agitation speed for 20–30 minutes. The rate of water addition and agitation was sufficiently slow to avoid inversion. Then there was continued agitation at moderate speed for 30 minutes. To a blend vessel there was added the second part of water, Formalin, bactericide and acetic acid. The emulsifier, oil, and part one of the water was then milled through a Manton-Gaulin colloid mill at high speed using three-inch rotor and stator and a clearance of 5–12 mils. The resultant paste that was obtained was blended with the part two water, bactericide and acetic acid blend contained in the blend vessel. The resultant emulsion was measured to be 40% silicone solids.

There was then prepared a mixture of the emulsions of the vinyl fluid as indicated above and of the hydride silicone resins which emulsions were prepared as indicated above. Accordingly, there was mixed 16 parts of the vinyl fluid emulsion with 1.6 parts of the hydride silicone resin emulsion to which was added 50 parts of water which contained 1% of sodium algenate, a water thixotropic, and to this there was added additional amounts of 32.4 parts of water. The above formulation was coated on Riegel #42 bleached Kraft paper at 15 lbs. per ream. The release value of such a coating, as measured on an Insatron Machine whose jaws open at a rate of 12 inches per minute, was 10-25 grams per inch. A good value for release of pressure sensitive adhesives. It was also observed in the foregoing test with the above composition that there was no smear or rub-off when the samples were tested.

Then there was carried out a Subsequent Adhesion Test. The Subsequent Adhesion Test requires the taking of pressure sensitive adhesive tape which had been stuck to the paper release coated paper and stripping it from the paper and applying it to a clean steel panel. To the same steel panel there is applied a pressure sensitive adhesive tape which was not adhered to any paper release coating. Then the panels were aged for 20 hours at 25° C. Rubber weights of 7.8 lbs. were applied over the pressure sensitive adhesive tapes stuck to the steel panel. After that the tapes were aged for 1 hour at 50% relative humidity and at 77° F., and the pressure sensitive adhesive tapes were pulled from the steel panel and the amount of force necessary to pull from the panel was determined. Then there was determined the Subsequent Adhesion Values, that is, the difference between the initial adhesion of the tape that was not stuck to any paper release coating and the adhesion value for the tape that was stuck to a paper release coating prior to being stuck to the aluminum panel, and the amount of the difference is calculated and divided by the adhesive value for the pressure sensitive adhesive panel that was not stuck to any paper release coating and the dividend is multiplied by 100. This gives the percentage value of how much the adhesion of the prestuck panel to a paper release coating differ from an adhesive panel which had not been adhered to any paper release coating. This test gives a quantative value for the amount of the cure of the paper release coating. The higher the cure of the paper release coating the less of it will become adhered to the pressure sensitive adhesive panel and thus the higher will be or closer will be the proximity of the pressure sensitive adhesive panel to the control in terms of forcing it to separate from the steel panel. Utilizing the above test, there was obtained a value for subsequent adhesion of between 90 and 100% with the above composition, indicating that the composition had cured almost completely.

EXAMPLE 2

There was taken the vinyl fluid emulsion of Example 1 and it was cured with two systems in accordance with the following.

There was prepared an emulsion (Composition C) comprising a mixture of 50 parts by weight of a trimethylsiloxane terminated methyl hydrogen polysiloxane polymer having a viscosity of greater than 1000 centipoise at 25° C. To this there was added 5.75 parts of alkylphenoxypolyethoxyethanol (nonionic emulsifier), 5.75 parts of a first quantity of water, 0.1 parts of Formalin and 38.4 parts of a second quantity of water. The emulsion was prepared by charging the methyl hydrogen polysiloxane oil to the premix vessel. Next the ethanol emulsifier is charged to the vessel and blended at 35°-40° C. for half an hour under moderate agitation speed. Then there was added slowly the first quantity of water, mixing was continued at 35°-40° C. under moderate agitation. Once all the first part of water was added the premix was blended an additional hour. The rate of water addition and agitation was sufficiently slow to avoid inversion. While the premix was being blended, the second part of water and Formalin (bactericide) was charged to a blend vessel, which was to be used to collect paste and blend same. The emulsifier, oil and part one water (premix) was then milled through a Manton-Gaulin colloid mill at high speed using two-inch rotor and stator and a clearance of 5 mils. The resultant paste that was obtained was blended with the part two water and bactericide in the blend vessel. The resultant emulsion was measured to be 40% silicone solids.

There was prepared a catalyst emulsion (Composition D) comprising a mixture of 33.3 parts by weight dibutyl tin dilaurate. To this there was added 5 parts odorless mineral spirits, 15 parts of a 10% polyvinyl alcohol solution and 46.7 parts water. The emulsion was prepared by charging the dibutyl tin dilaurate to the premix vessel. Next the odorless mineral spirits were charged and the vessel was stirred with moderate agitation to dispense the dibutyl tin dilaurate. The polyvinyl alcohol solution was added and the tin soap solution was blended for another half hour under moderate agitation. Then there was slowly added, the water, and the mixing was continued under moderate agitation for an additional half hour after all the water was charged. The rate of water addition and agitation was sufficiently slow to avoid preimersion. The emulsifier, tin soap, mineral spirits and water were then milled through a Manton-Gaulin colloid mill at high speed using three-inch rotor and stator and a clearance of 5-10 mils. The resultant emulsion obtained was then filtered through cheese cloth prior to measuring the solids. The resultant emulsion was measured to be 35% total solids.

To 16 parts of the emulsion of the vinyl fluid of Example 1 there was mixed .8 parts of Compositions C with 0.8 parts of Composition D. To these emulsions there was added 50 parts of water thickened with 1% of sodium algenate, a thixotrope. To the resulting mixture there was added an additional amount of 32.4 parts of water. The resulting formulation when applied as a paper coating cured to give a release value at the Insatron Machine opening at the rate of 12 inches per minute of 20-40 grams per inch. Although this value was a little high, it was, nevertheless, a still acceptable paper release value for paper release coatings in the industry. The above formulation also required 1 to 2 hours post-bake cure at room temperature at 50% relative humidity.

It should be noted that the samples in the present Example were also superior as paper release coatings as were the samples of Example 1, in that the samples show no smear or rub off thus indicating that the coating had good abrasion resistance. It was also felt that the paper release values and adhesion values could be lowered by increasing the post-bake cure period or by increasing the amount of tin catalyst. In any case, the vinyl fluid of Example 1 was cured with both a platinum system and tin system to yield a good paper release coating in each instance, as the data above indicates.

EXAMPLE 3

There was taken a vinyl fluid emulsion of Example 1 that was cured with the methyl hydrogen emulsion of Example 2, and another emulsion catalyst in accordance with the following.

There was prepared a Composition E, comprising a mixture of 20 parts by weight of di-(N-octyl)tin-S,S'-bis-(isooctyl mercapto acetate). To this tin soap there was added 20 parts of 10% polyvinyl alcohol solution, 0.1 parts of 6-acetoxy-2,4-dimethyl-m-dioxane (bactericide), 0.25 parts sodium laurylsulfate, 10 parts of a first quantity of water, and 49.65 parts of a second quantity of water. The emulsion was prepared charging the mercapto tin soap, polyvinyl alcohol solution and bactericide to the premix vessel and agitating 30–40 minutes at 30°±5° C. using moderate agitation speed. Next, the first quantity of water with the sodium laurylsulfate predissolved in the water was added to the premix vessel. Once the first quantity of water containing the dissolved sodium laurylsulfate had been added the agitation of the premix was continued for 60±25 minutes. The rate of water addition and agitation was sufficiently slow to avoid preinversion of the premix. To a blend vessel there was added the second quantity of water. The premix containing emulsifier, tin soap, bactericide, and water was then milled through a Manton-Gaulin colloid mill at high speed using three-inch rotor and stator and a clearance of 3–5 mils. The resultant paste that was obtained was blended with the second quantity of water contained in the blend vessel. The paste and water were agitated until uniform. Then the resultant blend was measured to be 22% total solids.

EXAMPLE 4

There was then prepared a mixture of emulsion of the vinyl fluid (Example 1, Composition A) and of the methyl hydrogen polysiloxane fluid which emulsion was prepared as indicated in Example 2, Composition C. Accordingly, there was mixed 16 parts of the vinyl fluid emulsion with 4 parts of the methyl hydrogen polysiloxane fluid emulsion to which was added 54 parts of water which contained 1% sodium algenate, a water thixotrope, and to this there was added 3.2 parts of mercapto tin catalyst emulsion (Composition E) and additional amounts of 22.8 parts of water. The above formulation was coated on Riegel #42 bleached Kraft paper at 0.5 lbs. per 3000 sq. foot ream. The release values of such a coating as measured on an Insatron Machine, whose jaws open at a rate of 12 inches per minute, was 8–19 grams per inch, a good value for release of pressure sensitive adhesives. It was also observed in the foregoing test with the above composition that there was no smear or rub-off when the coated paper samples were tested. Laminated samples which contained release coated paper, pressure sensitive adhesive and vinyl sheeting were cut in 1"×6" strips. These test strips were aged two weeks in a 70° C. air circulating oven with one kilogram (1"×1"×6") steel weight upon the samples. The samples were removed from the oven and were conditioned for 1 hour at 50% relative humidity and at 77° F. The pressure sensitive adhesive tapes were pulled on the Insatron Machine at a rate of 12 per minute. The force necessary to delaminate the test sample was measured to be 38–65 grams per inch, a good value for aged release of pressure sensitive adhesive.

We claim:

1. A paper release coating emulsion composition comprising (A) 100 parts by weight of a vinyl-containing polymer of the formula,

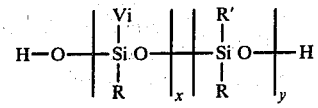

where Vi is vinyl, R is an aliphatically saturated monovalent hydrocarbon radical, R' is a monovalent hydrocarbon radical and x and y vary such that the polymer has a viscosity ranging from 1,500 to 24,000 centipoise at 25° C. in which the polymer has a silanol content that varies from 650 to 2,400 parts per million and a vinyl content that varies from 0.1 to 2% by weight; (B) from 1 part per million to 2 parts by weight of a catalyst selected from the class consisting of platinum catalyst and tin soaps of carboxylic acids; (C) from 1 to 30 parts by weight of a hydride polysiloxane crosslinking agent; (D) from 50 to 300 parts of water, and (E) from 5 to 80 parts by weight of emulsifying agents.

2. The composition of claim 1 wherein the vinyl-containing polymer has a vinyl content that varies from 0.1 to 2% by weight and a silanol content that varies from 650 to 2400 parts per million.

3. The composition of claim 1 wherein the catalyst is a platinum catalyst at a concentration of 1 to 200 parts per million.

4. The composition of claim 3 wherein the platinum catalyst is platinum complexed with hydrocarbon compounds selected from the class consisting of alcohols, aldehydes and ethers.

5. The composition of claim 3 wherein the platinum catalyst is platinum complexed with a vinyl siloxane wherein the platinum complex is substantially free of chemically combined chlorine.

6. The composition of claim 1 wherein the hydride polysiloxane has the formula,

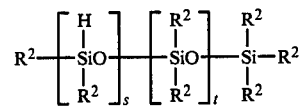

where $R^2$ is selected from hydrogen and monovalent hydrocarbon radicals and s, t vary such that the viscosity of the polymer varies from 1 to 250 centipoise at 25° C.

7. The composition of claim 6 wherein the polymer has a viscosity of 5–50 centipoise at 25° C., and a hydride content varying from 0.3 to 1.6% by weight.

8. The composition of claim 1 wherein the hydride polysiloxane is composed of $H(R^2)_2SiO_{0.5}$ units and $SiO_2$ units, where the H+$R^2$ to Si ratio varies from 1.0 to 2.7 and $R^2$ is a monovalent hydrocarbon radical.

9. The composition of claim 1 wherein the hydride polysiloxane is composed of $H(R^2)_2SiO_{0.5}$ units, $SiO_2$ units, and $H(R^2)SiO$ units where the ratio of $R^2$+H to Si varies from 1.0 to 2.7 and $R^2$ is a monovalent hydrocarbon radical.

10. The composition of claim 1 wherein the emulsifying agent is polyvinyl alcohol.

11. The composition of claim 1 wherein the hydride polysiloxane is first emulsified before it is added to the mixture.

12. The composition of claim 11 wherein the hydride polysiloxane is first emulsified in water and as the emulsifying agent an alkylphenoxypolyoxyethyleneethanol where the alkyl group has from 1 to 15 carbon atoms.

13. The composition of claim 1 wherein the catalyst is a tin soap of a carboxylic acid and is dibutyl tin dilaurate and is present at a concentration of 0.1 to 20 parts by weight as tin.

14. The composition of claim 1 wherein the catalyst is a mercapto tin soap of a carboxylic acid and is di(N-octyl)tin S,S'-bis-(isooctylmercaptoacetate) and is present at a concentration of 0.1 to 2 parts by weight as tin.

15. A process for forming a silicone paper coating comprising (1) emulsifying a mixture of (A) 100 parts by weight of a vinyl-containing polymer of the formula,

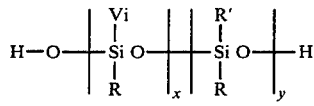

where Vi is vinyl, R is an aliphatically saturated monovalent hydrocarbon radical, R' is a monovalent hydrocarbon radical and x, y vary such that the polymer has a viscosity varying from 1,500 to 24,000 centipoise at 25° C. in which the polymer has a silanol content that varies from 650 to 2,400 parts per million and a vinyl content that varies from 0.1 to 2% by weight; (B) from 1 part per million to 2 parts by weight of a catalyst selected from the class consisting of platinum catalysts and tin soaps of carboxylic acids; (C) from 50 to 300 parts of water; and (D) from 5 to 80 parts by weight of emulsifying agents, (2) emulsifying a hydride polysiloxane; (3) adding the emulsion of the hydride polysiloxane to the emulsion of the vinyl-containing polymer such that there is present from 1 to 30 parts by weight of the hydride polysiloxane per 100 parts of the vinyl-containing polymer; and (4) allowing the composition to cure.

16. The process of claim 15 wherein the vinyl-containing polymer has a vinyl content that varies from 0.1 to 2% by weight and a silanol content that varies from 650 to 2400 parts per million.

17. The process of claim 15 wherein the catalyst is a platinum catalyst at a concentration of 1 to 200 parts per million.

18. The process of claim 17 wherein the platinum catalyst is a platinum complexed with a hydrocarbon compound selected from the class consisting of alcohols, aldehydes and ethers.

19. The process of claim 17 wherein the platinum catalyst is platinum complexed with a vinyl siloxane wherein the platinum complex is substantially free of chemically combined chlorine.

20. The process of claim 15 wherein the hydride polysiloxane has the formula,

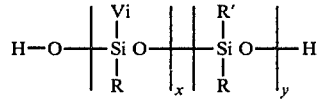

where $R^2$ is selected from hydrogen and monovalent hydrocarbon radicals, and s, t vary such that the viscosity of the polymer varies from 1 to 250 centipoise at 25° C.

21. The process of claim 20 wherein the hydride polysiloxane has a viscosity of 5–50 centipoise at 25° C., and a hydride content varying from 0.3 to 1.6% by weight.

22. The process of claim 15 wherein the hydride polysiloxane is composed of $H(R^2)_2SiO_{0.5}$ units and $SiO_2$ units where the $R^2+H$ to Si ratio varies from 1.0 to 2.7 and $R^2$ is a monovalent hydrocarbon radical.

23. The process of claim 15 wherein the hydride polysiloxane is composed of $H(R^2)_2SiO_{0.5}$ units, $SiO_2$ units, and $H(R^2)SiO$ units where the ratio of $R^2+H$ to Si varies from 1.0 to 2.7 and $R^2$ is a monovalent hydrocarbon radical.

24. The process of claim 15 wherein the emulsifying agent is polyvinyl alcohol.

25. The process of claim 15 wherein the hydride polysiloxane is emulsified in water and as the emulsifying agent there is used an alkylphenoxypolyoxyethyleneethanol where the alkyl group has from 1 to 15 carbon atoms.

26. The process of claim 15 wherein the catalyst is a tin soap of a carboxylic acid and is dibutyl tin dilaurate and is present at a concentration of 0.1 to 2 parts by weight as tin.

27. The process of claim 15 wherein the catalyst is a mercapto tin soap of a carboxylic acid and is di(N-octyl)tin S,S'-bis-(isooctylmercaptoacetate) and is present at a concentration of 0.1 to 2 parts by weight as tin.

28. A process for coating paper with a silicone paper release coating with excellent release properties to pressure sensitive adhesives comprising (1) emulsifying a mixture of (A) 100 parts by weight of a vinyl-containing polymer of the formula,

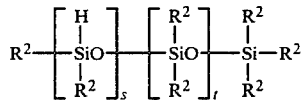

where Vi is vinyl, R is aliphatically saturated monovalent hydrocarbon radical, R' is a monovalent hydrocarbon radical and x, y vary such that the polymer has a viscosity varying from 1500 to 24,000 centipoise at 25° C. in which the polymer has a silanol content that varies from 650 to 2,400 parts per million and a vinyl content that varies from 0.1 to 2% by weight; (B) from 1 part per million to 2 parts by weight of a catalyst selected from the class consisting of platinum catalysts and tin soaps of carboxylic acids; (C) from 50 to 300 parts of water; and (D) from 5 to 80 parts by weight of emulsifying agents; (2) emulsifying a hydride polysiloxane; (3) adding the emulsion of the hydride polysiloxane to the emulsion of the vinyl-containing polymer such that there is present from 1 to 30 parts by weight of the hydride polysiloxane for 100 parts of the vinyl-containing polymer to form an emulsion mixture; (4) applying the emulsion mixture to paper; and (5) allowing the foregoing emulsion mixture to cure.

* * * * *